United States Patent [19]

Jansen

[11] Patent Number: 4,839,067

[45] Date of Patent: Jun. 13, 1989

[54] PROCESS FOR LUBRICATING AND CLEANING OF BOTTLE CONVEYOR BELTS IN THE BEVERAGE INDUSTRY

[75] Inventor: Georg Jansen, Kreuzau, Fed. Rep. of Germany

[73] Assignee: Akzo N.V., Arnhem, Netherlands

[21] Appl. No.: 92,200

[22] Filed: Sep. 2, 1987

[30] Foreign Application Priority Data

Sep. 19, 1986 [DE] Fed. Rep. of Germany ....... 3631953

[51] Int. Cl.$^4$ .......................................... C10M 133/04
[52] U.S. Cl. ..................................... 252/11; 252/49.3; 252/49.5; 252/50; 252/52 R; 198/495; 198/500
[58] Field of Search ................. 252/11, 49.3, 49.5, 252/50; 198/500, 495

[56] References Cited

U.S. PATENT DOCUMENTS

| 3,860,430 | 1/1975 | Walker et al. | |
| 4,087,320 | 5/1978 | Danahy et al. | 198/495 |
| 4,521,321 | 6/1985 | Anderson et al. | 252/32.5 |
| 4,604,220 | 8/1986 | Stanton | 252/49.3 |
| 4,666,615 | 5/1987 | Desch et al. | 252/11 |
| 4,674,622 | 6/1987 | Utsunomiya et al. | 198/500 |

FOREIGN PATENT DOCUMENTS

| 1272757 | 11/1963 | Fed. Rep. of Germany . |
| 1532533 | 2/1970 | Fed. Rep. of Germany . |
| 3129132 | 2/1983 | Fed. Rep. of Germany . |
| 957114 | 5/1964 | United Kingdom . |
| 2074526 | 11/1981 | United Kingdom . |

OTHER PUBLICATIONS

H & K Journal, 103, Oct. 1983, pp. 3, 18 and 20–26.
H & K Flaschentransportanlagen, PD 267.

*Primary Examiner*—Jacqueline V. Howard
*Attorney, Agent, or Firm*—Oliff & Berridge

[57] ABSTRACT

A process for the maintenance of chain-type bottle conveyor belts in beverage-filling plants, more particularly in breweries, wherein the chain-type bottle conveyor belts are lubricated with belt lubricating agents with a base of neutralized primary fatty amines and are cleaned with cationic cleaning agents or organic acids. The invention enables a smooth, continuous bottle conveyance operation.

16 Claims, No Drawings

PROCESS FOR LUBRICATING AND CLEANING OF BOTTLE CONVEYOR BELTS IN THE BEVERAGE INDUSTRY

TECHNICAL FIELD

The invention relates to a process for lubrication and cleaning of bottle conveyor belts, more particularly, apron conveyors, joint-frame conveyor chains and the like, as used, for example, for conveying beverage bottles from the unpacker to the washing machine, to the filler, to the labelling machine and to the packer.

BACKGROUND

In the beverage industry, for example, in breweries, the cleaning of bottles, their filling and labelling, etc. are mainly carried out automatically. Thus, for example, semiautomatic plants are capable of conveying approximately 2000 bottles and more per hour; fully automatic plants can handle up to approximately 80,000 bottles and more per hour.

During the filling operation, the bottles are conveyed on belts, the so-called "apron conveyors", most of which are made of stainless steel. These chain-type belts are lubricated with a chain sliding or lubricating agent, also known as "belt lubricant". Also, these conveyor belts must be cleaned, usually at more or less regular intervals.

In breweries, potash-based soft soaps, to which, for example, wynthetic monionic or ionic surfactants may be added, are preferably used as lubricatiing agents. A disvantage of these lubricating agents is that the potash-based soaps are sensitive to water hardness. Therefore, sequestering agents such as ethylenediamine tetraacetic acid, which partly mask the hardness, are also added as a rule.

If the water is hard, the familiar problems associated with hard water occur, i.e., the effectiveness of the lubricating agent is reduced, and also, for example, the precipitated calcium salts can lead to lubrication problems, because they do not, as do the alkali metal soaps, reduce the friction resistance between bottle and chain. There is also the danger that the carbonic acid in the water and the $CO_2$ from the air will cause the fatty acids to precipitate, which can also lead to lubrication problems.

Another disadvantage when using potash-based soft soaps as lubricating agents is that, although precipitated lime soaps and fatty acids are readily bio-degradable, they also represent a good nutrient substrate for bacteria. Thus, there develops under the chains and between the chain links a slime which very rapidly leads to the production of unpleasant odors due to bacterial degradation. The slime thus formed must therefore be jetted away frequently with water, for example by means of a high-pressure gun. Nevertheless, it is not possible to stop the production of odors completely; moreover, the slime which has been flushed away naturally also develops the foul smell elsewhere.

It is also known in the art to use, instead of potash-based soft soaps, synthetic lubricating agents, particularly those with an amine base, which do not have the disadvantages of potash-based fat soaps. However, these cationic lubricating agents are sensitive to anions, with the result, in particular, that the nozzles through which the lubricating agents are metered onto the conveyor belts become clogged over time. Thus, such lubricating agents react in particular with anions, such as carbonates and sulfates, which are present in abundance in the water used. The same reactions may also occur on the belts, so that the poorly soluble products formed by the reaction of the belt lubricant with anions reduce the lubricating or sliding effect.

Therefore, the need still exists in the beverage industry, especially in breweries, to improve the belt lubrication and the cleaning of the conveyor belts.

SUMMARY OF THE INVENTION

Accordingly, an object of the invention is to make possible the lubrication and cleaning of chain-type bottle conveyor belts without the formation of tenacious deposits and objectionable odors, as when using potash-based soaps as belt lubricants.

Another object of the invention is to enable the cleaning of the metering devices as well.

Yet another object of the invention is to enable trouble-free conveyance of the bottles by means of the conveyor belts, without causing operational breakdowns due to inadequate belt lubrication or problems when cleaning the belts and the metering devices for the belt lubricant.

These and other objects are achieved with a process for the lubrication of chain-type bottle conveyor belts in beverage filling plants, especially in breweries, as well as cleaning of the belts by means of a liquid cleaning agent, wherein the chain-type bottle conveyor are lubricated with belt lubricants with a base of neutralized primary fatty amines and the bottle conveyor belts are cleaned with cationic cleaning agents or organic acids.

DETAILED DESCRIPTION OF PREFERRED EMBODIMENTS OF THE INVENTION

Preferably, the comnveyor belts are lubricated continuously. Advantageously, the conveyor belts are cleaned intermittently.

In a particularly advantageous embodiment of the process in accordance with the invention, the cleaning agents are applied to the conveyor belts by means of belt-lubricant metering devices.

Very suitable are belt lubricants with a base of 5 to 20% of a mixture, neutralized with acetic acid to a pH of 6 to 8, of (a) primary fatty amines, which preferably have 12 to 18 carbon atoms and an unsaturated proportion of more than 10%, (b) 1 to 5% of ethoxylated fatty alcohols, ethoxylated fatty amines or ethoxylated nonylphenol with a degree of ethoxylation of 5 to 15, (c) 1 to 5% of triethanolamine, (d) 5 to 12% of isopropanol, and the rest water.

Alkylamines with 12 to 20 carbon atoms can be used as the primary fatty amines. Preferably, however, mixtures of straight-chain fatty amines with 12 to 18 carbon atoms are used, especially those with a high proportion of unsaturated fatty amines. Mixtures of primary fatty amines with an unsaturated proportion of at least 50 weight percent are suitable for the belt lubricant.

Cleaning agents with a base of quaternary ammonium compounds are preferred as the cationic cleaning agents. In a particularly advantageous embodiment of the process according to the invention, a cleaning agent is used which has a base of quaternary ammonium compounds, and which contains (a) 30 to 45 weight percent of quaternary ammonium compounds, (b) 1 to 5% of ethoxylated fatty alcohols, ethoxylated fatty amines or ethoxylated nonylphenol with a degree of ethoxylation of 5 to 10, (c) 0 to 5 weight percent of isopropanol, and the rest water.

Within the scope of the invention, alkyldimethylbenzylammonium, alkyltrimethylammonium and dialkyldimethylammonium chlorides, in which the alkyl groups preferably have 12 to 18 carbon atoms, are especially suitable as the quaternary ammonium compounds. Alkyldimethylbenzylammonium chlorides with 12 to 14 carbon atoms are particularly suitable in this case.

Organic acids behave even better than the above-mentioned cationic cleaning agents. They are said to form readily soluble amine salts. Gluconic acid and acetic acid are most especially suitable. Advantageously, the acids are used in a concentration of at least 0.5 weight percent, especially 0.5 to 5 weight percent.

In accordance with the invention, all belts as are customarily used to convey bottles in the beverage industry are bottle conveyor belts. This includes the belts which are used for the actual conveyance of the bottles, as well as those parts of the belts which form so-called bottle stations, on which the bottles are brought together during conveyance or from which they are carried away again. The process is suitable for belts which convey either with or without an incline.

This type of bottle conveyor belts is described, for example, in H & K Journal 103, Oct. 1983, Holstein and Kappert GmbH, Postfach 308, D-4600 Dortmund 1, or in Brochure PD 267, "H & K Bottle Conveyor Systems", of the Holstein and Kappert Company, Dortmund.

To carry out the process in accordance with the invention, one can proceed as follows: An aqueous solution of the lubricating agent or belt lubricant is prepared and, by means of a traditional metering station and, using normal nozzles, it is metered onto the chain-type belt in a quantity which is suficient to develop an adequate lubricating effect on the belt. In general, the viscosity of the agents is set at approximately 20 to 80 mPa.sec.

In accordance with the invention, concentrations between 0.2 and 1.0 weight percent of the belt lubricant are sufficient for lubrication. The diluted solutions can be sprayed onto the belts continuously or by metering at intervals (e.g., 20 seconds of spraying, 10 seconds of off-time). A metering system designed for lubricants with a soap base can also be operated in accordance with the invention, without modifications.

A second station can be used for cleaning, with which the conveyor belts, especially the lubricating points, are sprayed at regular or irregular intervals.

It is of special advantage to pass the cleaning agent through the metering devices with which the belt lubricant is applied during operation. This can be done, for example, at the end of one or more shifts. For this purpose, the belt lubricating system is turned off and the cleaning agent is introduced between the storage tank for the belt lubricant and the belt-lubricant metering devices. In this way, the metering pumps, pipelines and distributing nozzles are cleaned as well.

A very surprising finding was that, with the process in accordance with the invention, one can ensure a trouble-free continuous bottle-conveying operation in the beverage industry. It is not necessary to clean during a shift. It is entirely sufficient to carry out a cleaning operation after one or more shifts, e.g., daily or weekly. In this way, precipitates which reduce the lubricating effect of the lubricants are prevented from forming at the lubricated points of the bottle conveyor belts. Undesired deposits and clogging of the distributing nozzles will not occur, since it is entirely sufficient to carry out the cleaning operations after relatively long intervals.

The lubricants and cleaning agents dripping from the belts are not nutrient substrates for bacteria, which is of great importance for the hygiene conditions in the filling, labelling and washing operation. Cleaning agents and belt lubricants can readily be jatted away without difficulty using water and cause no problems even during the treatment of the waste water and, in particular, they do not produce objectionable odors.

When using fatty amines with a high unsaturated proportion, one can employ with very good results even relatively longchain fatty amines, whose lubricating capacity is greater than that of relatively short chain products.

The invention will now be illustrated in greater detail by the following non-limiting examples:

EXAMPLE 1

A belt lubricant with the following composition: 4% of distilled coconut oil amine, 4.5% of distilled oleylamine, 3.5% of 60% acetic acid, 2% of soybean oil amine. 15 EO, 2% of triethanolamine, 6% of isopropanol and 78% of water, is injected in a concentration of 0.55% via a metering station, into the water stream (water with 15° dh hardness—° dH is equivalent to a 10 mg/liter of CaO or 7.14 mg/liter of MgO) of the central lubricating system, and sprayed continuously through nozzles onto the conveyor belts. In comparison with a soap-based product, an equally good lubricating effect is obtained, but without the formation, as in the case of soap products, of foam on the belts and on the floor. Deposits of lubricant residues between the individual belts and chain links remain extremely small; a biological infestation and resultant odor production is not observed, even after weeks of operation. The belts remain glossy and smooth. Separate cleaning with a high-pressure gun is unneccessary.

At the end of the operation, in the evening hours, the metering system is changed over to the cleaning mode. Instead of the belt lubricant, a cleaning agent composed of 82% of 50% benzalconium chloride (=coconut oil dimethylbenzylamonium chloride), 8% of nonylphenol. 9 EO, 5% of isopropanol and 10% of water is injected into the pipeline system, so that a concentration of about 2% results. The cleaning agent is sprayed for about 15 minutes, and the pipelines are allowed to remain filled overnight. Any deposits formed in the pipes are disolved. The exiting cleaning solution sanitizes the belt sections. On the next working day, the metering system is changed back to the belt lubricant. The changeover can be effected by an automatic timer cirucit.

EXAMPLE 2

From a gas cylinder, $CO_2$ was passed into an aqueous solution of the belt lubricant according to Example 1. In the process, white precipitates were a formed which hardly dissolved in the cleaning agent according to Example 1, but did so readely—and even very rapidly—in 2% gluconic acid or acetic acid.

I claim:

1. A process for conveying bottles on chain-type bottle conveyor belts, comprising the steps of lubricating the chain-type bottle conveyor belts with at least one belt lubricant comprising a base of neutralized primary fatty amine, and cleaning the bottle conveyor belts with at least one cleaning agent selected from the group consisting of cationic cleaning agents and organic acids.

2. The process as recited in claim 1, wherein the conveyor belts are lubricated continuously.

3. The process as recited in claim 1, wherein the conveyor belts are cleaned intermittently.

4. The process as recited in claim 1, wherein the cleaning agent is applied to the conveyor belts by means of a belt-lubricant metering device.

5. The process as recited in claim 1, wherein said belt lubricant comprises a base of 5 to 20% of a mixture, neutralized with acetic to a pH 6 to 8, of primary fatty amines, 1 to 5% of at least one member selected from the group consisting of ethoxylated fatty alcohols, ethoxylated fatty amines and ethoxylated nonylphenol with a degree of ethoxylation from 5 to 15, 1 to 5% of triethanolamine, 5 to 12% of isopropanol, and the rest water.

6. The process as recited in claim 5, wherein said primary fatty amines contain 12 to 18 carbon atoms and an unsaturated proportion of more than 10 %.

7. The process as recited in claim 1, wherein said cleaning agent comprises said cationic cleaning agent which in turn comprises a quaternary ammonium compound.

8. The process as recited in claim 7, wherein said cationic cleaning agent contains 30 to 45% of at least one quaternary ammonium compound, 1 to 5 weight percent of at least one member selected from the group consisting of ethoxylated fatty alcohols, ethoxylated fatty amines and ethoxylated nonylphenol with a degree of ethoxylation from 5 to 10, 0 to 5 weight percent of isopropanol, and the rest water.

9. The process as recited in claim 7, wherein said quaternary ammonium compound is at least one member selected from the group consisting of alkyltrimethylammonium chloride, dialkyldimethylammonium chloride and alkyldimethylbenzylammonium chloride with alkyl groups which have 12 to 18 carbon atoms.

10. The process as recited in claim 9, wherein said quaternary ammonium compound is an alkyldimethylbenzylammonium chloride with an alkyl group having 12 to 14 carbon atoms.

11. The process as recited in claim 1, wherein said primary fatty amine comprises a fatty amine mixture with an unsaturated proportion of at least 50 weight percent.

12. The process as recited in claim 1, wherein said cleaning agent comprises said organic acid, and said organic acid forms highly soluble amine salts.

13. The process as recited in claim 12, wherein said organic acid is at least one member selected from the group consisting of gluconic acid and acetic acid.

14. The process as recited in claim 12, wherein said organic acid is present in a concentration of at least 0.5 weight percent.

15. The process as recited in claim 14, wherein said concentration is from 0.5 to 5 weight percent.

16. The process as recited in claim 1, wherein said belt lubricant is an aqueous belt lubricant having a viscosity of 20 to 80 mPa.s.

* * * * *

UNITED STATES PATENT AND TRADEMARK OFFICE
CERTIFICATE OF CORRECTION

PATENT NO. : 4,839,067
DATED : June 13, 1989
INVENTOR(S) : Georg JANSEN

It is certified that error appears in the above-identified patent and that said Letters Patent is hereby corrected as shown below:

Column 1, line 30, change "wynthetic" to --synthetic--;
        line 32, change "disvantage" to --disadvantage--.

Column 2, line 37, change "comnveyor" to --conveyor--.

Column 3, line 36, change "suficient" to --sufficient--.

Column 4, line 8, change "jatted" to --jetted--;
        line 44, change "8%" to --3%--;
        line 50, change "disolved." to --dissolved.--;
        line 61, change "readely" to --readily--.

Column 5, line 13, after "acetic" insert --acid--.

Signed and Sealed this

Twentieth Day of February, 1990

*Attest:*

JEFFREY M. SAMUELS

*Attesting Officer*     *Acting Commissioner of Patents and Trademarks*